(12) United States Patent
Kritikos

(10) Patent No.: US 10,173,283 B2
(45) Date of Patent: Jan. 8, 2019

(54) METHOD FOR HEAT TREATING A TOOL

(71) Applicant: Channellock, Inc., Wilmington, DE (US)

(72) Inventor: Daniel Kritikos, Guys Mills, PA (US)

(73) Assignee: CHANNELLOCK, INC., Wilmington, DE (US)

( * ) Notice: Subject to any disclaimer, the term of this patent is extended or adjusted under 35 U.S.C. 154(b) by 474 days.

(21) Appl. No.: 15/089,665

(22) Filed: Apr. 4, 2016

(65) Prior Publication Data

US 2016/0288252 A1   Oct. 6, 2016

(51) Int. Cl.
| | |
|---|---|
| *B23K 26/00* | (2014.01) |
| *B25B 7/22* | (2006.01) |
| *B23K 26/352* | (2014.01) |
| *B23K 26/06* | (2014.01) |
| *B23D 35/00* | (2006.01) |
| *B23K 101/20* | (2006.01) |
| *B23K 103/04* | (2006.01) |

(52) U.S. Cl.
CPC ........ *B23K 26/352* (2015.10); *B23K 26/0608* (2013.01); *B25B 7/22* (2013.01); *B23D 35/001* (2013.01); *B23K 2101/20* (2018.08); *B23K 2103/04* (2018.08)

(58) Field of Classification Search
CPC ............ B23K 26/00; B23K 26/07; B25B 7/22
USPC ............ 219/121.61, 121.76, 121.77, 121.78, 219/121.82, 121.85
See application file for complete search history.

(56) References Cited

U.S. PATENT DOCUMENTS

| | | | |
|---|---|---|---|
| 4,561,721 A | 12/1985 | Keilmann et al. | |
| 7,324,202 B2 | 1/2008 | Leonard et al. | |
| 9,259,803 B2* | 2/2016 | DiGiovanni | B23K 26/0823 |
| 2002/0104831 A1* | 8/2002 | Chang | B23K 26/0075 |
| | | | 219/121.7 |

* cited by examiner

*Primary Examiner* — Samuel M Heinrich
(74) *Attorney, Agent, or Firm* — Marvin Feldman; Lackenbach Siegel, LLP

(57) ABSTRACT

A method for heat treating a hand tool wherein generally conical or pyramidal shaped laser beams are generated and have respective apexes or focal points of different thermal energies operably disposed with respect to differently configured portions and masses of the hand tool for simultaneous different effective heat treatment.

30 Claims, 5 Drawing Sheets

METHOD FOR HEAT TREATING A TOOL

PRIOR RELATED APPLICATIONS

This application claims priority to and is a non-provisional application of provisional application Ser. No. 62/143,354, filed Apr. 6, 2015, which application is incorporated herein in its entirety by reference thereto.

BACKGROUND

Field of the Invention

This invention relates to heat treating a tool. Specifically, this invention relates to heat treating a bladed hand tool, particularly a bladed pliers.

Background of the Invention and Discussion of the Prior Art

The prior art generated a single collimated or columnar laser beam to heat treat a hand tool. Referring to FIG. 1, there is shown the prior art thermal image depiction or profile of the single columnar laser beam, generally referred to in the art as the "top hat" 10. The generated operable thermal energy is disposed at the base 11 of the top hat 10, and is generated from the collimated beam 16. The operable thermal energy has a consistent value across the base 11 of the top hat 10. The base 11 is operably disposed above the hand tool (not shown in FIG. 1) While the top hat is somewhat effective for heat treating equal mass portions of the hand tool, such as pliers' teeth, the top hat produced indiscriminate heat treatment for differently configured and different mass portions of a hand tool. This is particularly so with respect to a blade cutting edge and an opposed anvil of a bladed pliers. FIG. 3 shows the prior art resultant heat treating effects of blade edge 13 and anvil 12 of pliers 14. The shaded portions 15a and 15b indiscriminately cover both the blade edge portion 13 and the opposed anvil portion 12. An undesired heat treatment resulted from the use of the top hat 10 for a bladed pliers.

The art desires a method and apparatus for selectively heat treating distinctly different portions of a hand tool. The art desires a solution as aforesaid particularly in which a hand tool blade edge is effectively heat treated while another portion of a different mass and configuration of the bladed hand tool, particularly the anvil portion, is simultaneously effectively heat treated.

The present invention provides a solution to the aforesaid art needs.

SUMMARY OF THE INVENTION

This invention, in one principal aspect, is a method for heat treating distinctly different portions of a hand tool, particularly including bladed pliers.

In another aspect, the present invention is a method for laser heat treating a tool by (a) generating a first beam and a second beam having respective first and second apexes or focal points having respective thermal energies with respect to heat treating a tool, having a first portion and a second portion of different mass and configuration, (b) disposing the tool with respect to the focal points, wherein the first tool portion is operably disposed with respect to the first focal point and the second portion is operably disposed with respect to the second focal point, so that the first and second tool portions are differently, simultaneously effectively heat treated.

In a further aspect, the present invention is a method for heat treating a tool having a blade edge and an anvil having respective shoulder portions by generating first and second beams having respective apexes, and each apex is focused on a respective shoulder portion to effect resultant selective heat treatment of the blade and particularly the blade edge. The blade edge and anvil are in contacting engagement in the heat treating process The invention, in another further aspect, is a hand tool, particularly including a bladed pliers, produced by the aforesaid method.

The invention is, in a still further aspect, an apparatus for heat treating the bladed tool by the aforesaid method.

DESCRIPTION OF THE INVENTION

The terms "conical", "conically", "pyramidal" and "pyramidally", as used hereinbefore and hereinafter, mean a geometric shape having an apex, and includes without limitations a generally conical and generally pyramidal configuration.

The term "focal point", as used hereinbefore and hereinafter, means an area of focus by a laser beam in contradistinction to a geometric point.

Figure 1:
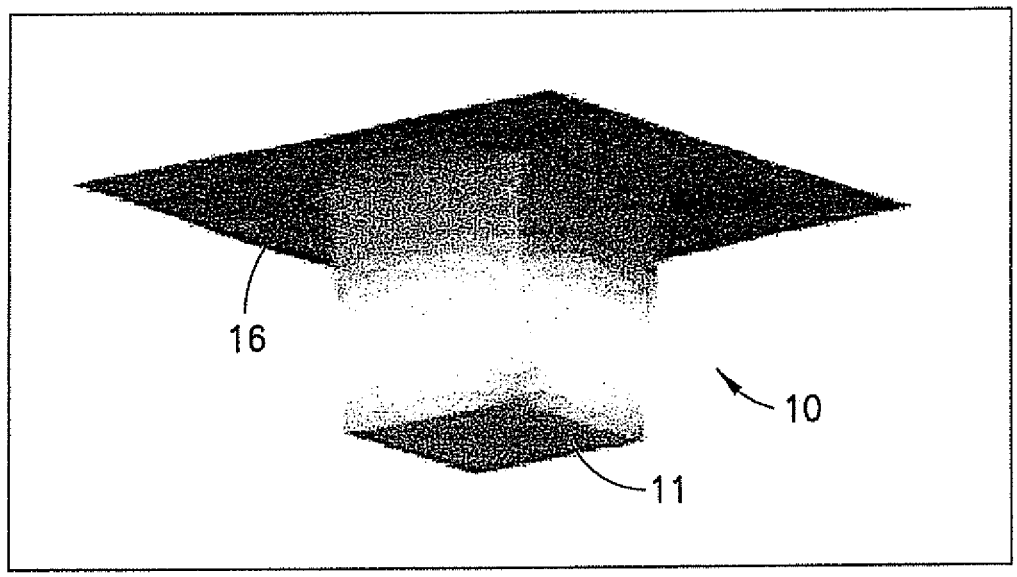
FIG. 1 is a thermal energy profile depiction of the Prior Art top hat laser beam profile.
Figure 2:
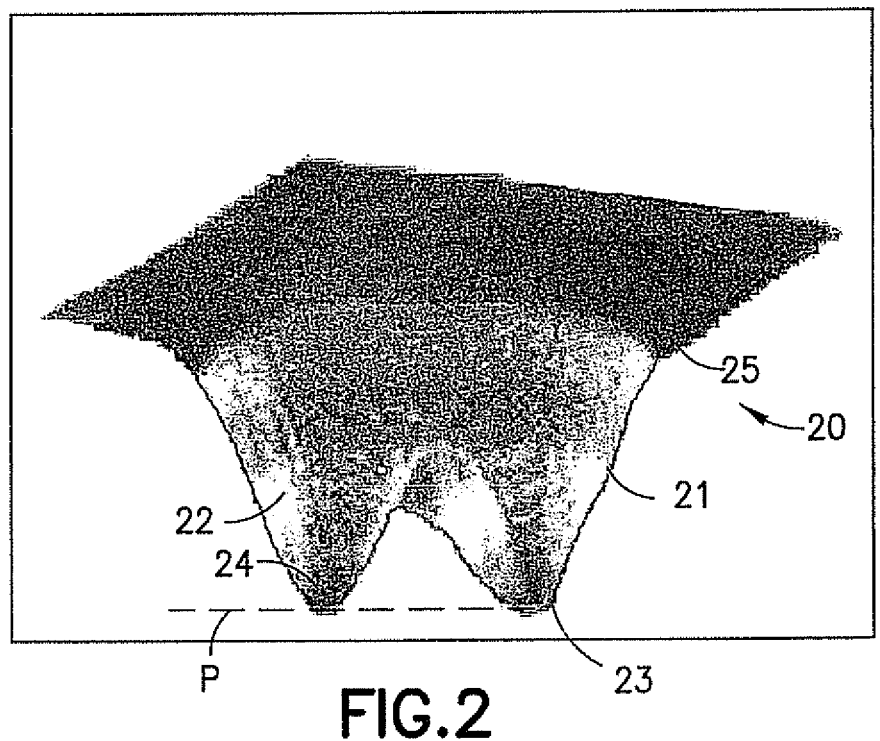
FIG. 2 is a thermal energy profile depiction of the dual laser beam of the present invention.
Figure 3:
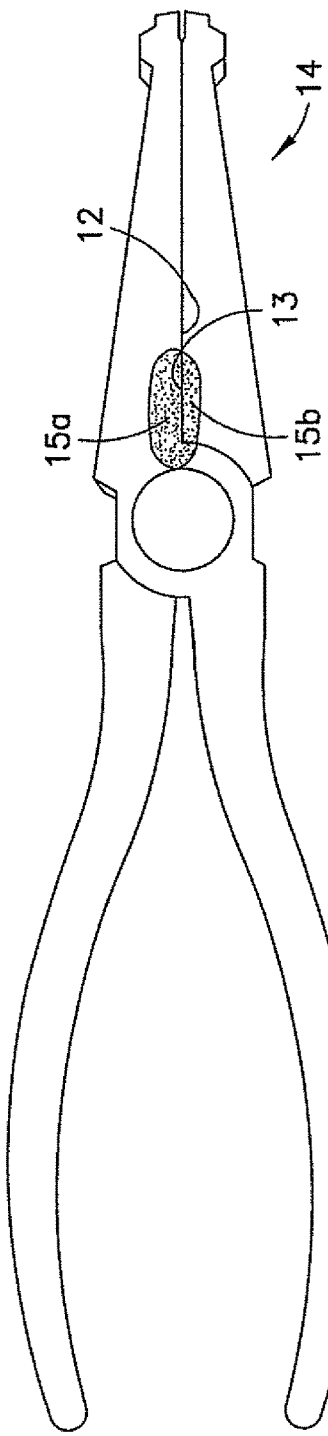
FIG. 3 is a top plan view of the Prior Art thermal effect on bladed pliers treated according to the thermal energy of FIG. 1.

Referring to FIGS. 2, 4 and 5-7, there is shown the present invention. Referring specifically to FIG. 2, there is shown the dual beam 20 energy profile 29. Dual beam 20 includes a first conical or pyramidal beam 21 and a second conical or pyramidal beam 22. Beam 21 has apex 23, and beam 22 has apex 24. Apexes 23 and 24 form respective focal points and are disposed in plane P. Beams 21 and 23 are generated from collimated input beam 25.

Figure 4:
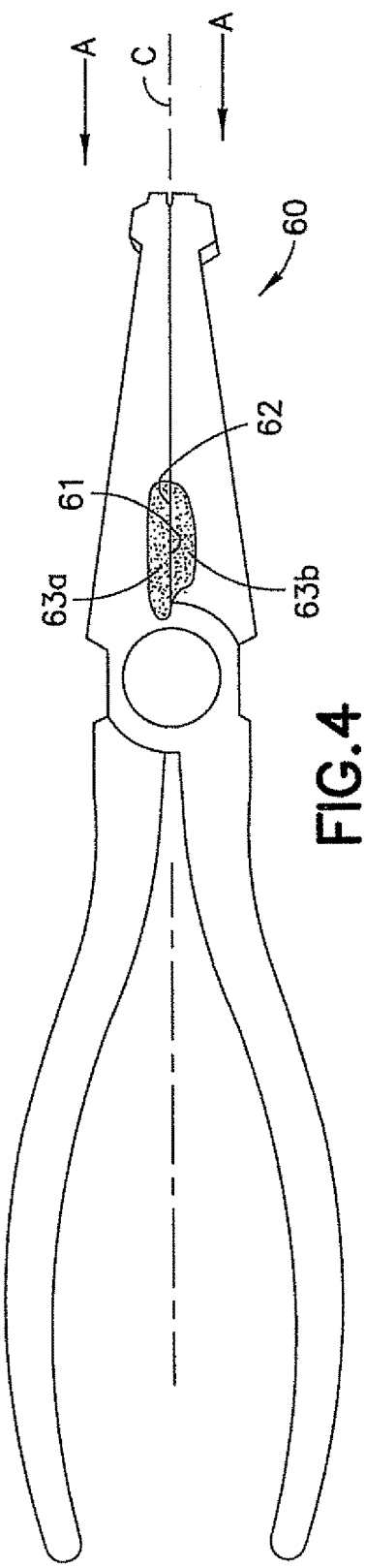
FIG. 4 is a top plan view of the thermal effect of a bladed pliers treated according to the thermal energy of FIG. 2.

Referring specifically to FIG. 4, there is shown hand tool or bladed pliers 60 of known construction in the art heat treated by the dual beam 20 as shown in FIG. 2. Conical beam apexes or focal points 23 and 24 are disposed at respective portions 61 and 62 of tool 60 for purposes hereinafter discussed. Pliers 60 has blade edge 62 contactingly engaged with anvil 61. Pliers 60 is heat treated according to the conical dual beams as shown in FIG. 2. Beam 21 has a larger focal point or area than beam 22 and concomitantly provides less thermal energy to the blade edge 62 than beam 22 provides to anvil 63, as will be further discussed hereinafter. The respective resultant heat treated areas or masses are shown at 63b and 63a. The masses 63b and 63a demonstrate the respective effective simultaneous heat treatment effect of the distinctly different thermal energies to the respective blade edge and anvil masses.

Figure 5:
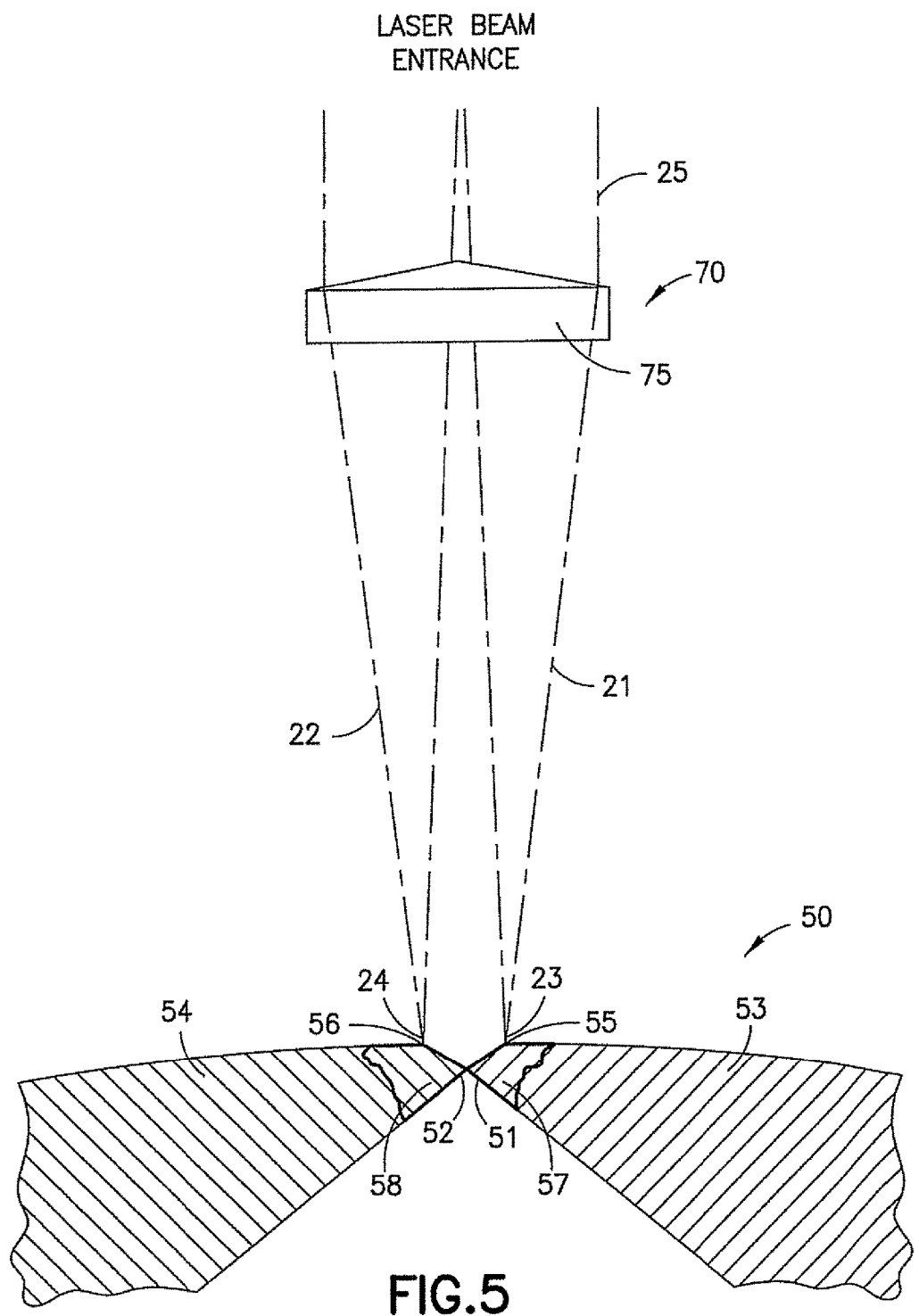
FIG. 5 is a schematic illustration of the dual beam heat treatment of a bladed pliers.
Figure 6:
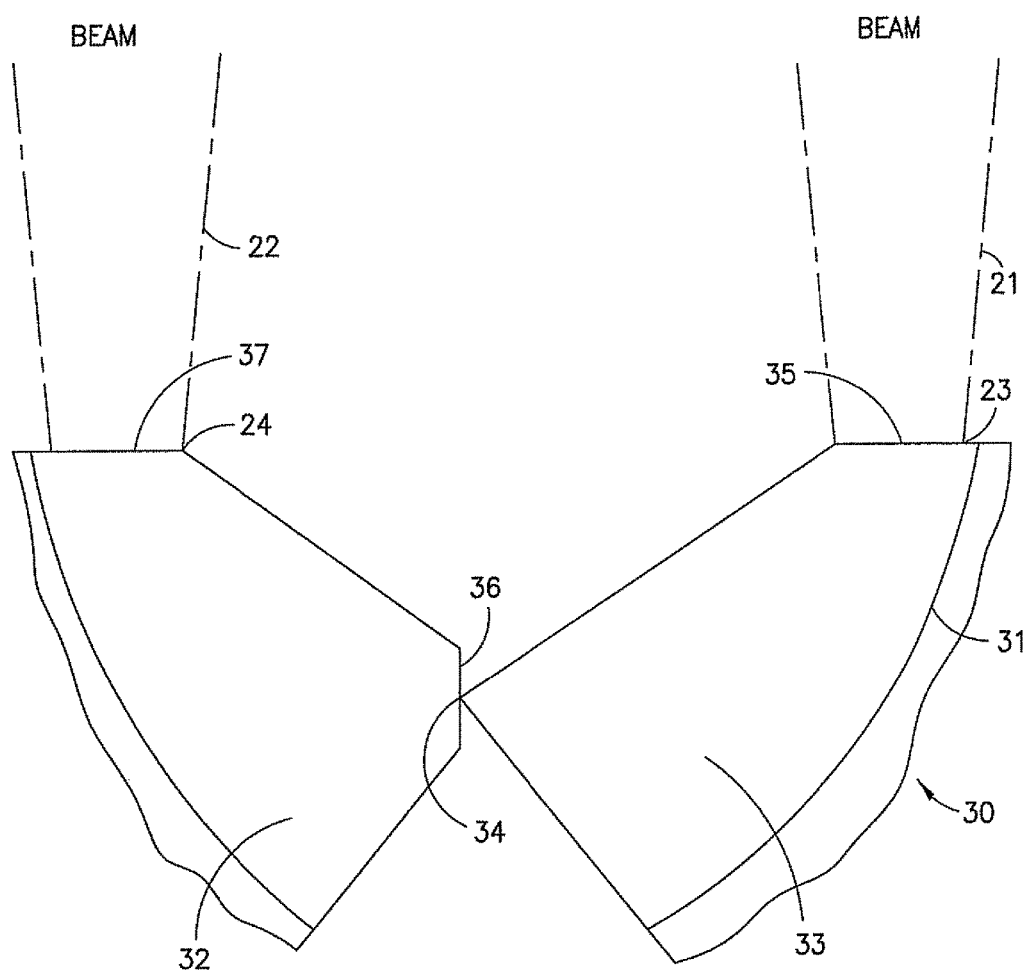
FIG. 6 is a greatly enlarged schematic illustration of respective dual beams respectively heat treating a blade edge and an opposed anvil of a bladed pliers tool.

Referring specifically to FIG. 5, there is shown a schematic illustration of the present invention with respect to bladed pliers 50. Collimated beams 25 are processed through lens apparatus or assembly 70, particularly conical lens unit 75, to provide conical beams 22 and 21, with respective focal points or areas 24 and 23, of different respective focal areas 37 and 35 as best shown in FIG. 6. Focal area 37 is smaller than focal area 35 and concomitantly higher thermal energy (FIG. 6). This higher thermal energy is disposed at anvil shoulder 56 and provides effective heat treatment to mass 58 immediately adjacent anvil 52. The approximately 50% lower energy of focal area 23 is disposed at blade shoulder 55, and provides effective heat treatment to mass 57 immediately adjacent blade edge 51. Blade edge 51 and anvil 52 of respective jaws 53 and 54 are in contacting engagement during the simultaneous heat treatment of anvil 52 and blade edge 51. There is thermal conduction at the point of contacting engagement.

Referring specifically to FIG. 6, there is shown a bladed pliers 30 of FIG. 4 being heat treated in accordance with the present invention. Pliers 30 has opposed jaws 31 and 32. Jaw 31 has cutting blade 33 and blade edge 34, and a shoulder 35. Jaw 32 has anvil 36 and adjacent shoulder 37. The jaw metal mass immediately adjacent anvil 36 is greater than the metal mass immediately adjacent blade edge 34. Blade edge 34 and anvil 36 are in contacting engagement as at 35 during the heat treatment of the present invention. Conical beams 21 and 22 and specifically apexes or focal points 23 and 24 contactingly engage shoulders 35 and 37. In this embodiment, conical beam 21 is attenuated or of lesser focal area than conical beam 22 so as to provide less thermal energy to the blade edge than to the area. In the preferred embodiment of a blade edge and anvil pliers, conical beam 21 has 40-60% lens thermal energy than conical beam 22, and most preferably about 50% less thermal energy. Generally 35% of the power is disposed at the blade edge focal point, and 65% of the power is disposed at the anvil focal point. The result is simultaneous discriminate heat treatment of the blade edge and anvil of the pliers.

Figure 7:
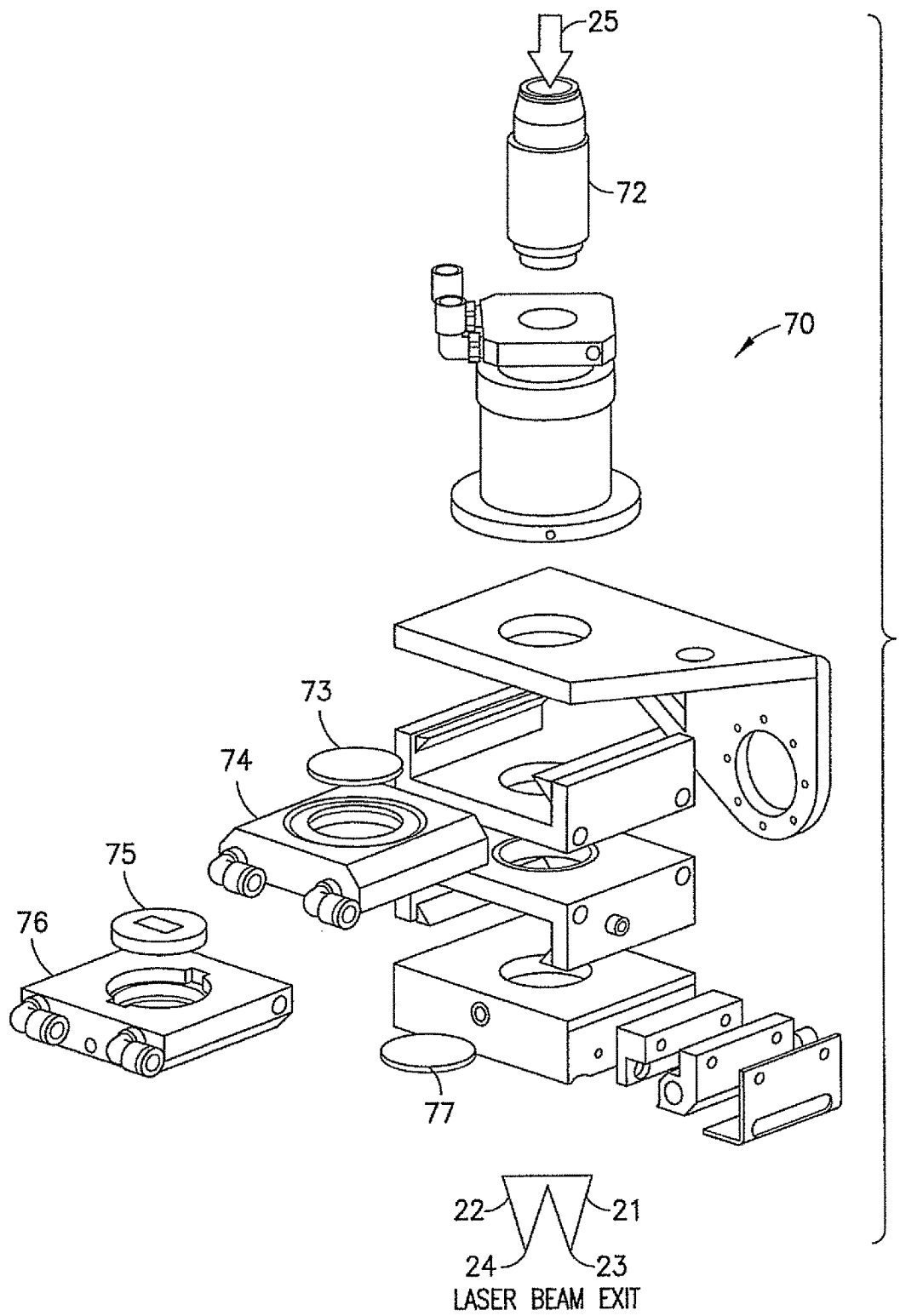
FIG. 7 is an exploded view of the dual laser beam lens apparatus of the present invention.

Referring specifically to FIG. 7, there is shown the dual beam lens apparatus 70. Lens apparatus 70 includes a collimated beam entry coupler 72 with collimated beam 25, a collimated lens 73 in lens holder assembly 74 for generating collimated beams. Apparatus 70 includes a dual conical beam lens assembly 75 in holder 76 to generate conical beams 21 and 22. A laser lens protective debris shield 77 completes the assembly. Dual beams 21 and 22, with respective apexes 23 and 24 are operably disposed on portions of the tool as shown in FIGS. 5 and 6. Apparatus 70 is moved in the direction of arrows A along the centerline C of tool or pliers 30, as best shown in FIG. 4.

It is known in the lens art to generate a conical beam from a collimated beam as disclosed in U.S. Pat. No. 7,324,202 to Leonard et al., and it is also known in the laser art to attenuate a laser beam as disclosed in U.S. Pat. No. 4,561,721 to Keilmann et al., which references are incorporated herein in their entireties by reference thereto.

The directional movement of the beams, as shown by arrows A in FIG. 4, is from the distal end towards the proximate end of the pliers. This directional movement of the apparatus 70 and conical beams 21 and 22 provides a self-quenching heat dissipation effect emanating into the cutting blade edge and anvil masses.

Tools most suitable to heat treatment by the present invention are preferably C1080 steel pliers, particularly pliers having at least one cutting blade.

With respect to a conventional or standard C1080 steel pliers with a blade edge and anvil, the dual beams focal point, have respective areas of 2.5×13 mm for the anvil and 4.0×13 mm for the blade edge. The difference in focal areas is consistent with the different operable powers or thermal energies for heat treatment. The larger blade edge focal area generally has 60% less power than the smaller anvil focal area. The focal points are spacedly disposed to further provide discriminatory heat treatment with respect to the blade edge and anvil. The micro-structural integrity of the blade edge is maintained, as a result of the methodology of the present invention.

While the embodiments of FIGS. 4-6 are illustrative of similar cutting pliers, the present invention contemplates other hand tools of different mass portions requiring different or discriminatory simultaneous heat treatments.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A method for laser heat treating a tool, said method comprises:
    (a) generating a first beam and a second beam comprising respective first and second apexes comprising respective first and second focal points having respective thermal energies for heat treating a tool comprising a first portion and a second portion;
    (b) disposing the tool portions with respect to the focal points;
    wherein the tool first portion is operably disposed with respect to the first focal point and the tool second portion is operably disposed with respect to the second focal point;
    whereby the first and second tool portions are respectively heat treated.

2. The method of claim 1, said first portion comprises a blade having a cutting edge, and wherein each said beam comprises a conically shaped beam, and each conically shaped beam apex comprises a respective focal point, and wherein the first focal point is disposed adjacent the cutting edge.

3. The method of claim 1, Step (a) further comprises generating each of the first and second beams from a collimated beam.

4. The method of claim 1, said tool comprises a centerline, and further comprising moving the beams with respect to the centerline of the tool, each said beam being disposed on an opposite side of the centerline.

5. The method of claim 2, further comprising attenuating or modulating the first beam so that the blade edge receives less thermal energy than the second portion.

6. The method of claim 2, wherein the cutting blade comprises a shoulder spacedly disposed frm the blade edge and the first focal point is disposed immediately adjacent the shoulder.

7. The method of claim 1, said focal points being disposed in a plane, and wherein the focal points comprises respective areas disposed in the plane, and the first and second tool portions comprise respective target areas, and wherein the respective focal point areas are congruent with the respective target areas.

8. The method of claim 1, wherein the tool comprises a steel pliers, and the first and second steel portions comprise respective jaws.

9. The method of claim 8, wherein the first portion jaw comprises a blade cutting edge, and further comprising moving the beams from the distal end towards the proximate end of the pliers.

10. The method of claim 9, further comprising attenuating or modulating the first beam so that the cutting blade edge receives less thermal energy than the second portion, said second portion comprises an anvil for the cutting edge.

11. The method of claim 2, said focal points being disposed in a first plane, and the tool being disposed in a second plane, and further comprising providing relative movement between the tool and beams with the second plane in parallel disposition with respect to the first plane.

12. The method of claim 1, wherein the first portion comprises less mass than the second portion, and the first portion comprises a bladed portion, and the first and second portions are in contactingly engagement and simultaneously heat treating the respective contactingly engaged portions.

13. The method of claim 12, wherein the tool comprises a C1080 steel pliers.

14. The method of claim 13, wherein the first and second portion comprise respective jaws.

15. The method of claim 2, each said beam comprises a conical or pyramidal shape, and the apexes comprise the respective focal points having respective focal areas.

16. The method of claim 15, said focal points being disposed in a plane, and providing relative movement between the tool and beams with the tool in parallel disposition to the focal points plane in heat treating the tool.

17. The method of claim 1, further comprising modulating to the first beam for generating the first beam providing less thermal energy than the second beam.

18. The method of claim 17, said tool being disposed in a plane, each said beam said focal points being disposed in a plane, comprises a generally conical or pyramidal shape, and wherein the apices comprise the respective focal points, said tool plane being in parallel disposition with respect to the focal points plane, and further comprising providing relative movement between the tool in the tool plane and the focal points plane in the heat treating.

19. The method of claim 1, said tool comprises a steel construction hand tool.

20. The method of claim 19, said tool comprises pliers, and said first portion comprises a cutting blade having a cutting edge, and he second portion comprises an anvil for the cutting edge, and wherein the micro-structural integrity of the blade cutting edge is maintained in heat treating the anvil.

21. The method of claim 20, wherein the focal points comprise respective areas and the first and second portions comprise respective target areas, and wherein the respective focal point areas area commensurate with the respective target areas.

22. The method of claim 21, wherein the blade edge and planar surface are in contacting engagement and with simultaneously heat treating the portions there is thermal conduction between the contactingly engaged portions.

23. A tool produced according to the method of claim 1.

24. A tool produced according to the method of claim 2.

25. A tool produced according to the method of claim 6.

26. A tool produced according to the method of claim 20.

27. An apparatus for heat treating a hand tool, said apparatus comprises:
 (a) means for generating collimated laser beams, and
 (b) means for generating first and second conical or pyramidal laser beams from the collimated laser beams, said conical laser beams having respective apexes comprising respective focal points; and
operably disposed said focal points with respect to the first and second portions of the hand tool.

28. The apparatus of claim 27, further comprising in combination; the tool, said tool comprises a steel pliers, and the first portion comprises a jaw having a cutting blade having a base or shoulder edge, and wherein the first focal point is disposed immediately adjacent the shoulder.

29. The apparatus of claim 28, further comprising means for attenuating the first beam so that the first focal provides less thermal energy to the cutting blade than the second focal provides to the other jaw.

30. The apparatus of claim 27, said (a) and (b) being disposed in one apparatus.

* * * * *